US007054415B2

(12) United States Patent
Beere

(10) Patent No.: US 7,054,415 B2
(45) Date of Patent: May 30, 2006

(54) ALARM METHOD AND DEVICE

(75) Inventor: Edgar Jozef Beere, Hillegom (NL)

(73) Assignee: Marchfun International N.V., Curacao (AN)

( * ) Notice: Subject to any disclaimer, the term of this patent is extended or adjusted under 35 U.S.C. 154(b) by 18 days.

(21) Appl. No.: 10/239,263

(22) PCT Filed: Mar. 23, 2001

(86) PCT No.: PCT/NL01/00244

§ 371 (c)(1),
(2), (4) Date: Nov. 27, 2002

(87) PCT Pub. No.: WO01/73714

PCT Pub. Date: Oct. 4, 2001

(65) Prior Publication Data

US 2004/0095238 A1 May 20, 2004

(30) Foreign Application Priority Data

Mar. 23, 2000 (NL) .................................... 1014735

(51) Int. Cl.
*H04M 11/04* (2006.01)

(52) U.S. Cl. ............................ 379/51; 379/44; 379/37; 348/143

(58) Field of Classification Search ............ 379/37–51; 348/143, 152–155

See application file for complete search history.

(56) References Cited

U.S. PATENT DOCUMENTS

| | | | | |
|---|---|---|---|---|
| 3,617,640 | A * | 11/1971 | Cichanowicz | 379/40 |
| 4,777,526 | A | 10/1988 | Saitoh et al. | |
| 4,887,291 | A | 12/1989 | Stillwell | |
| 4,996,703 | A | 2/1991 | Gray | |
| 5,136,281 | A | 8/1992 | Bonaquist | |
| 5,729,197 | A * | 3/1998 | Cash | 379/41 |
| 5,787,429 | A * | 7/1998 | Nikolin, Jr. | 707/10 |
| 5,943,394 | A * | 8/1999 | Ader et al. | 379/40 |
| 6,035,016 | A | 3/2000 | Moore | |
| 6,295,346 | B1 * | 9/2001 | Markowitz et al. | 379/127.01 |
| 6,385,772 | B1 * | 5/2002 | Courtney | 725/105 |

FOREIGN PATENT DOCUMENTS

| | | | |
|---|---|---|---|
| DE | 3827928 | A | 2/1990 |
| EP | 529196 | A | 3/1993 |
| EP | 805426 | A | 11/1997 |
| GB | 2258114 | A | 1/1993 |
| JP | 63052590 | A * | 3/1988 |
| WO | WO 8905553 | A | 6/1989 |
| WO | WO 9615615 | A | 5/1996 |

* cited by examiner

*Primary Examiner*—Wing Chan
(74) *Attorney, Agent, or Firm*—The Webb Law Firm

(57) ABSTRACT

The invention relates to a method for selectively informing at least one person in the case of an alarm condition of an object, comprising of producing successive images of the object with at least one camera, comparing successive images, establishing at least one communication connection with the person in the case an image differs to a predetermined extent from a previous image, and sending an alarm report to the person over this communication connection.

23 Claims, 3 Drawing Sheets

ALARM METHOD AND DEVICE

BACKGROUND OF THE INVENTION

1. Field of the Invention

The invention relates to a method for selectively informing at least one person in the case of an alarm condition of an object.

2. Description of the Prior Art

In a known method an emergency centre is alerted in case of an alarm condition. An employee of the emergency centre who is apprised of the alarm condition will in turn alert a person designated for this purpose or the police. It is subsequently expected of the designated person or the police that they will go and investigate in order to establish whether there is an actual alarm condition or whether there has been a false alarm.

It is found in practice that false alarm occurs frequently, which has the result that the designated person or the police are increasingly less inclined to take action in the case they are alerted.

Known from European patent application 0 805 426 is a surveillance system and method. The system consists of at least one camera, the images of which are compared to the previous image. When there is a difference between the reference image and the camera image, the image processing module selects that changed portion of the total image and subsequently sends that portion via a communication means to at least one remotely situated observer. On the basis of the image material sent to him this person can take action. The alarm can be switched off remotely, or the police can be alerted. In this manner a person, for instance the owner of the object for surveillance, making use of present communication means, functions as intermediate link and the police are only alerted at a later stage. This surveillance system however allows one method of alarm via a limited communication means. The receiving of an alarm report is not guaranteed either, nor is a check made by the surveillance system whether the report has been received or read. In addition, different people cannot receive specific alarm reports. As final drawback can be mentioned that the person to be alerted can be disturbed with an alarm report at any time of the day/week.

SUMMARY OF THE INVENTION

The invention now has for its object to provide a method of the type specified in the preamble wherein a person can be alerted with a certain flexibility and the chance of false alarm is minimized.

In the case of an alarm condition one or more communication connections can be made over which different alarm reports can be sent depending on the possibilities of the communication connection. There may be communication connections with one and the same person, although it is also possible to alert a plurality of persons simultaneously about the alarm condition by means of the communication connection.

The content of the alarm report can be designed in different ways. The alarm report can be a prerecorded sound report, as well as a sound report composed by a computer and completed with current information, such as the point in time and/or the location of the alarm condition. The alarm report may also be text-only, as well as fixed text or a flexible computer report. A report can also comprise an image of the object where an alarm condition has been determined. In addition, the alarm report can comprise sound fragments from the area surrounding the object where the alarm condition has been determined. The alarm report may further also comprise a warning that an image or sound fragment has already been sent via a different communication means.

A suitable communication connection is chosen subject to the alarm report to be sent. A text message can thus be sent via SMS, WAP or the like as well as via e-mail. Visual material can be sent via Internet or e-mail to a suitable portable or fixed telephone. Sound fragments can likewise be sent via Internet as well as to telephones and the like.

In addition, a silent or loud alarm can be generated in the case of an alarm condition.

False alarms are usually the result of incorrectly adjusted sensors, such as infrared sensors. By causing the alarm warning to depend on a camera image, the chance of an incorrect report is considerably reduced.

The relevant person can examine the image recorded by the camera and determine himself whether there is indeed any question of an alarm condition, for instance in the case an unauthorized person is visible on the image, or whether there is indeed a false alarm. It will hereby be possible with certainty to prevent any unnecessary action on the part of the relevant person or persons. Lying within the scope of the invention is the possibility of alerting a number of people simultaneously. These contact persons can favourably be family members and acquaintances. Social control is therefore as it were automated with the method according to the invention. The direct contact and the direct control which is characteristic of social control is now also realized here in that the physical distance of the contact persons from the object has become unimportant.

Different connections are hereby used to inform the relevant person or persons as quickly as possible, so that in the case of an actual alarm condition he can respond very rapidly.

Via the voice connection, which can for instance be effected by a simple telephone connection, the person is alerted that an alarm condition has occurred, whereupon he can take action to examine the image sent via a separate image connection or for instance streamline video. The alerted person or persons gain a better insight into the situation at the location of the object under surveillance.

The images produced by the camera can be processed simply in a computer using per se known software and transmission of the images can also take place using per se known software.

If it is indeed found that a correct alarm condition has occurred, particularly because the differing image shows an unauthorized person, it is possible to determine afterwards who the unauthorized person is, and the image can optionally form an indication or evidence of the unauthorized conduct of the unauthorized person.

In the case of an alarm condition of an object, an alarm action plan is formulated which provides an overview of the alarm reports which must be sent as a consequence of the alarm condition. The alarm report can comprise any of the above described types.

The alarm action plan can further comprise a list of persons who must be alerted in the case of an alarm condition. Different reports can be sent to different persons. Different communication connections can be chosen via which a connection can be established with the person who must be alerted. The chosen connection will depend on the alarm report to be sent.

A further preferred embodiment relates to an alarm action plan which designates a time sequence in the communication connections to be made. In this manner it is possible to first seek contact with a first person, followed by a second, and so on. The same person can also be alerted successively via different communication connections. An alarm action plan with time planning also provides the possibility of alerting different person first at different times of the day. In this way the method of the alarm action plan becomes very flexible and user-friendly and enables the sending of a specific report via a dependent communication connection to a specific person at a separate point in time.

Another embodiment enables the contacted person to respond to the alarm condition via the communication connection. When the alarm report comes in on a GSM device, the reply OK can be given by pressing keys 6 and 5. These numbers represent the letters O and K on the GSM device. It is likewise possible to respond with the computer when the communication connection comprises an e-mail alarm report. Acceptance of the report by the addressee with OK or the like means that the report is transferred to this person. This person will inspect the alarm condition. The alarm action plan will not be completed.

According to a further development it is possible to operate the invention via the established communication connection. It is thus possible to switch off the activated alarm. Other components of the invention can also be controlled via this communication connection.

It is preferably made possible to have the response and operation take place making use of a voice connection. The invention will response to a recorded command in suitable manner via the communication connection.

The invention can also recognize recorded texts and check them for authenticity. The operation of the invention is thus prevented from falling into the hands of a person who is not allowed to do this.

In addition, it is possible to verify the receipt of different alarm reports for receiving and/or reading thereof by the recipient. When the sent alarm report is an e-mail, this can take place in known manner.

The invention also relates to and provides a device for performing a method according to the invention. It has been found that false alarms are often also the result of incorrect operation of the alarm system. Operating errors are precluded to a very considerable extent by making use of voice recognition and voice control.

The invention further comprises means for processing and storing data of the alarm action schedule. When the alarm action schedule is set into operation in the case of an alarm condition, the data from the schedule is processed and contact is made by the invention via a communication network with the inputted list of the alarm action schedule.

Finally, a remotely situated second computer can be connected to a communication connection, a server on which the user can make settings corresponding with his preferred settings, and which can take over the surveillance functions of the first computer in the case this first computer breaks down. This could occur during a burglary followed by sabotage. The preferred settings comprise for instance the alarm action plan or the alarm report for changing. Organization of this server can take place in known manner. If the communication connection of the device allows, third parties can also retrieve the image from the cameras. This option can be adjusted by the user in desired manner.

The invention likewise relates to and provides software for causing a computer to function as a device according to the invention.

BRIEF DESCRIPTION OF THE DRAWINGS

The invention will be further elucidated in the following description with reference to the annexed figure.

FIG. 1 shows schematically a device with which the method according to the invention can be applied.

DETAILED DESCRIPTION OF THE PREFERRED EMBODIMENTS

Figure 1:
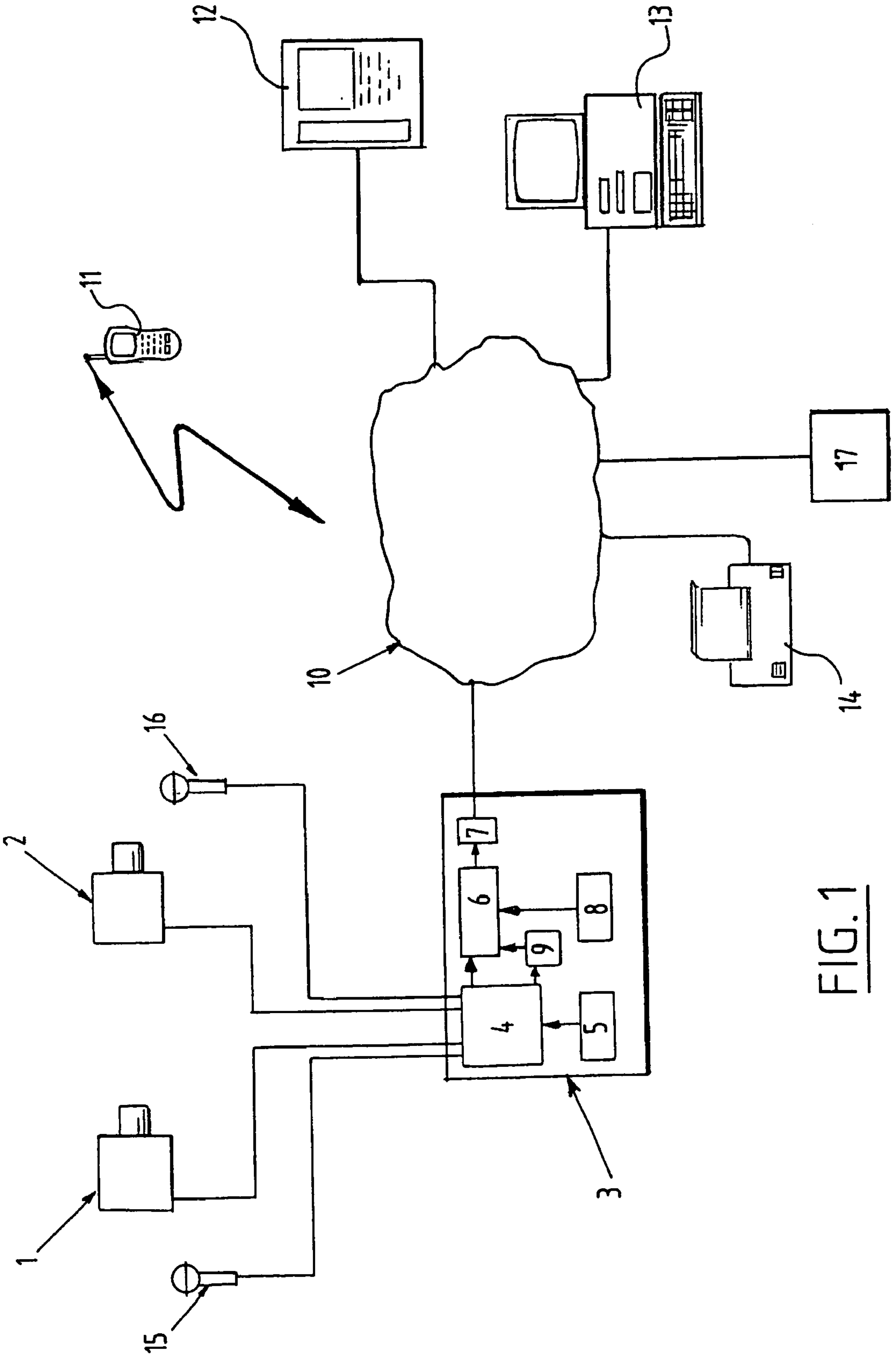
FIG. 1 shows a surveillance device according to the method.

Shown are a number of, in this case two, cameras 1,2, which are preferably digital cameras and in further preference CCD-cameras. Such cameras are commercially available in many embodiments, particularly in embodiments which can be connected via standard interfaces to a computer, in particular a PC.

In addition to a number of cameras, a number of microphones 15, 16 are also arranged in this preferred embodiment. These microphones 15, 16 can be integrated in cameras 1, 2, but can also be separate.

The device further comprises a computer or PC 3. Incorporated in this computer 3 is a processing module 4 which can be deemed as assembled on the one hand from an interface for the electric coupling to cameras 1 and 2 and microphones 15, 16, and on the other from software which can process the image signals from these cameras 1 and 2 and sound signals from microphones 15, 16.

The image processing software is embodied such that successive images from each of the cameras 1 and 2 are compared.

Cameras 1 and 2 are directed at the objects for surveillance or monitoring, such as for instance doors or windows of a building, an entrance gate, a part of the premises and the like.

Processing module 4 is adapted such that after an adjusting period successive images from each of the cameras 1 and 2 are compared to each other. Using an image adjusting module 5 the acceptable degree of difference between two successive images can be set. As soon as this adjusted value of the two successive images from one or more of the cameras is exceeded, a message module 6 is activated.

Adjusting module 5 for processing module 4 can further contain options for showing images from each of the cameras on a monitor and options for storing images, for instance at an adjustable interval. The software can also comprise options for playback of recorded images.

When it is determined by the image processing module 4 that one or more images from the cameras differ from the previous one, a message module 6 is activated as noted above. One or more of the differing images are simultaneously stored in a section of memory 9.

Message module 6 is connected to a communication member, such as for instance a modem 7. Via this communication member a connection can be brought about to a communication network, which can for instance be a telephone network 10.

Computer 3 can be connected to server 17 via communication network 10. Server 17 is adapted such that it can take over functions of computer 3 in the case that computer 3 breaks down, for instance due to sabotage. Server 17 is in direct contact with cameras 1 and 2 and/or microphones 15 and 16 via communication network 10. Server 17 comprises memory means which can take over and execute the settings for computer 3. The server can also be adjusted by the user to execute only some of the functions. In the case of an alarm situation the image material is sent to server 17 and then distributed by this server 17 in accordance with the set alarm schedule.

A list or database of contact persons, to whom messages can be sent as the case arises, can be stored in memory 9 of computer 3. The list forms the alarm action schedule. In this schedule further information can for instance be included concerning the times at which the relevant persons may not be disturbed, so that no messages will be sent to these persons during these relevant periods. In this schedule can of course also be included the necessary information as to the manner in which the messages must be communicated to the relevant contact persons.

An adjusting module 8 is coupled to image module 6. Using this adjusting module 8 the image module 6 is adjusted such that a determined communication connection can be effected in the case that a situation of differing successive images is recognized by image processing module 4. This connection can for instance be with a mobile telephone 11, a fixed telephone 12, a PC 13 or a fax 14. Using the adjusting module 8 a recorded message can be selected which is sent to the relevant telephone apparatus 11 or 12 via the communication connection to be established. The image stored in memory 9 can simultaneously be sent to an image-processing device such as a PC 13 or fax 14. The alarm report sent to telephone 11 or 12 contains for instance a message that an image has been sent via an image-transmitting connection to for instance the PC 13 or fax 14.

PC 13 can be programmed and equipped to reproduce the sent images in a suitable manner. The present possibilities comprise for instance e-mail, streamline video, Internet and the like.

As well as a recorded message, an SMS-message can for instance also be sent to a mobile telephone 11.

The person or persons called using telephone 11 or 12 can then view the sent image on PC 13 or fax 14 and determine whether there is indeed an alarm condition, i.e. whether the condition recognizable from the image is for instance undesirable.

If for instance an unauthorized person makes his way onto a premises, the first image from a camera directed at these premises on which the person can be seen will differ from the previous image. The differing image is stored in memory 9 and message module 6 is activated by image processing module 4 so as to send a recorded message to mobile phone 11 or fixed telephone 12 via communication member 7. The image stored in memory 9 is simultaneously sent to PC 13 or fax 14. The message sent to telephones 11 or 12 contains a warning to the person answering the telephone to refer to the PC 13 or fax 14. After analysing the image, the person can then take appropriate action, such as for instance alerting the police or the like. When the person does not accept or receive the alarm report, the following person in the alarm action schedule will be alerted.

Sending of the image can take place using software which comprises standard PC software. An image can for instance be sent to a PC 13 with existing e-mail software or, using similar software, to fax 14.

In addition to an alarm in the case of an undesired situation, for instance the presence of an unauthorized person, the method and device can also be used for more general surveillance. Using the method and device according to the invention an entrance check for instance can thus be performed in a building or premises where no persons are present. As soon as someone appears at the entrance, and is "seen" by a camera disposed there, a report will be transmitted to a remote location. The person who receives the report can then view the image which has also been sent and determine whether the person who has appeared at the entrance may obtain access to the premises or building. The entrance can then be released with remote control.

Although in the annexed figure there are shown only two cameras and microphones in each case and only one example of the communication equipment 11–14, it will be apparent that the number of cameras/microphones is relatively unlimited and that furthermore the number of communication units to which messages are sent is also relatively unlimited.

Figure 2:
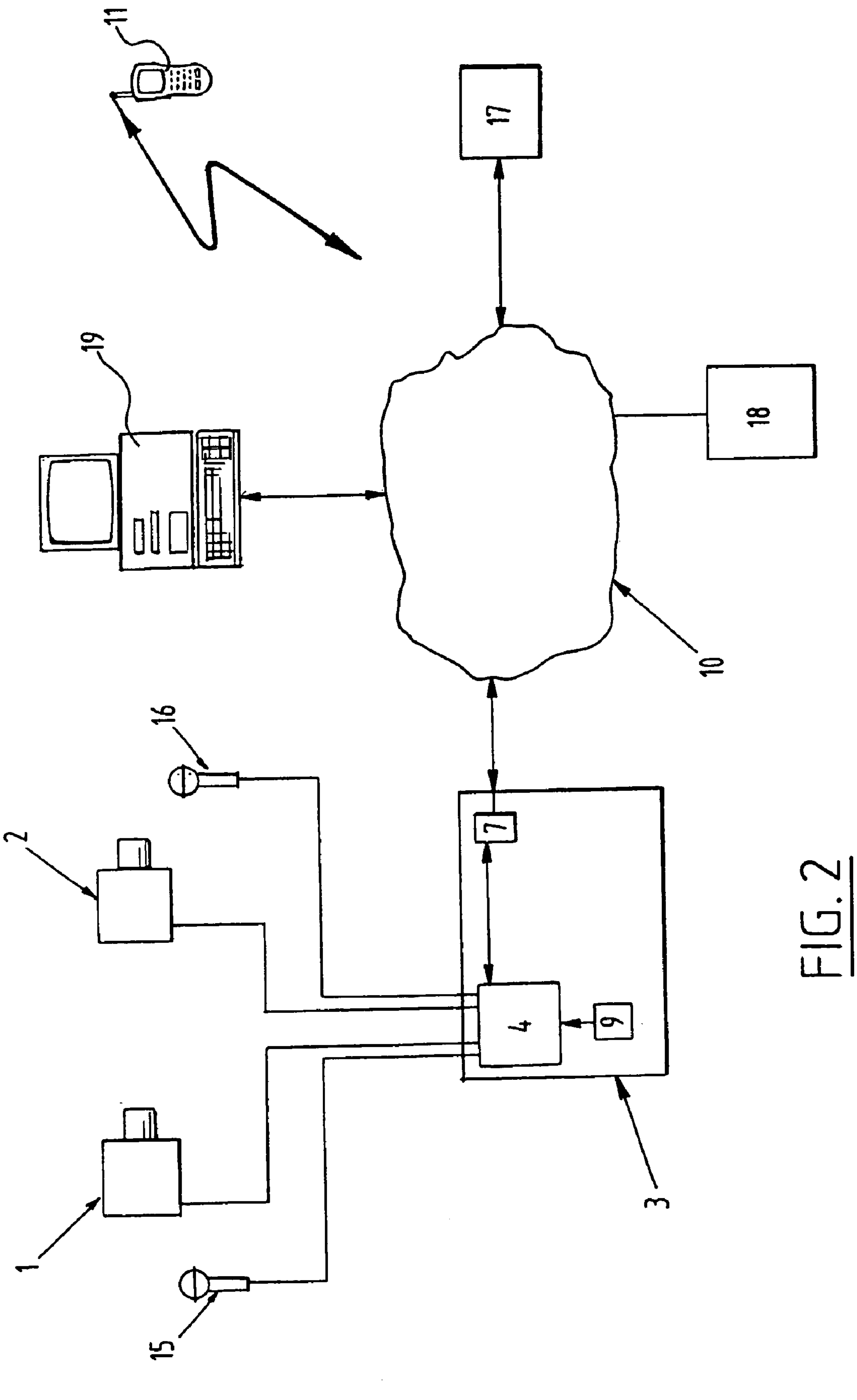
FIG. 2 shows the same surveillance device in interaction with different communication means.

FIG. 2 shows a second preferred embodiment wherein the emphasis is placed on the interaction which is possible with computer 3. In this preferred embodiment the computer 3 comprises at least processing module 4, memory means 9 and modem 7. Adjusting modules 5 and 8, as well as message module 6 can likewise be arranged and function in the above specified manner. With cameras 1 and 2 and microphones 15 and 16 an alarm condition can be determined in an object, which condition can be processed by processing module 4. On the basis of the information in memory means 9, image processing module 4 will make contact via modem 7 with a computer 19 and a mobile telephone 11 or the like by means of a communication means network 10. Computer 19 and mobile telephone 11 have the option of responding to the call of computer 3 by inputting data on the keyboard and sending it back to processing module 4 via communication means 10 and modem 7. The alarm condition can thus be disabled remotely.

In the case of an alarm condition, image processing module 4 can make contact via communications network 10 with server 17 which undertakes execution of the alarm action plan and makes contact via the communications network with the different preferred communication means as inputted in the alarm action schedule. Server 17 can receive the images or sound transmitted once-only from computer 3, but can also have a direct connection to the cameras 1 and 2 and microphones 15 and 16.

There is also the possibility of computer 3 or server 17 checking whether a sent e-mail has been received and read. The e-mail is sent to a mail account at a server 18 connected to for instance Internet. It is possible to have server 18 send back reports, e-mails relating to the status of a message, such as received and/or read. When a message is not received or read, computer 3 or server 17 can continue with follow-up action. The subsequent step from the alarm action schedule can thus for instance be executed.

Figure 3:
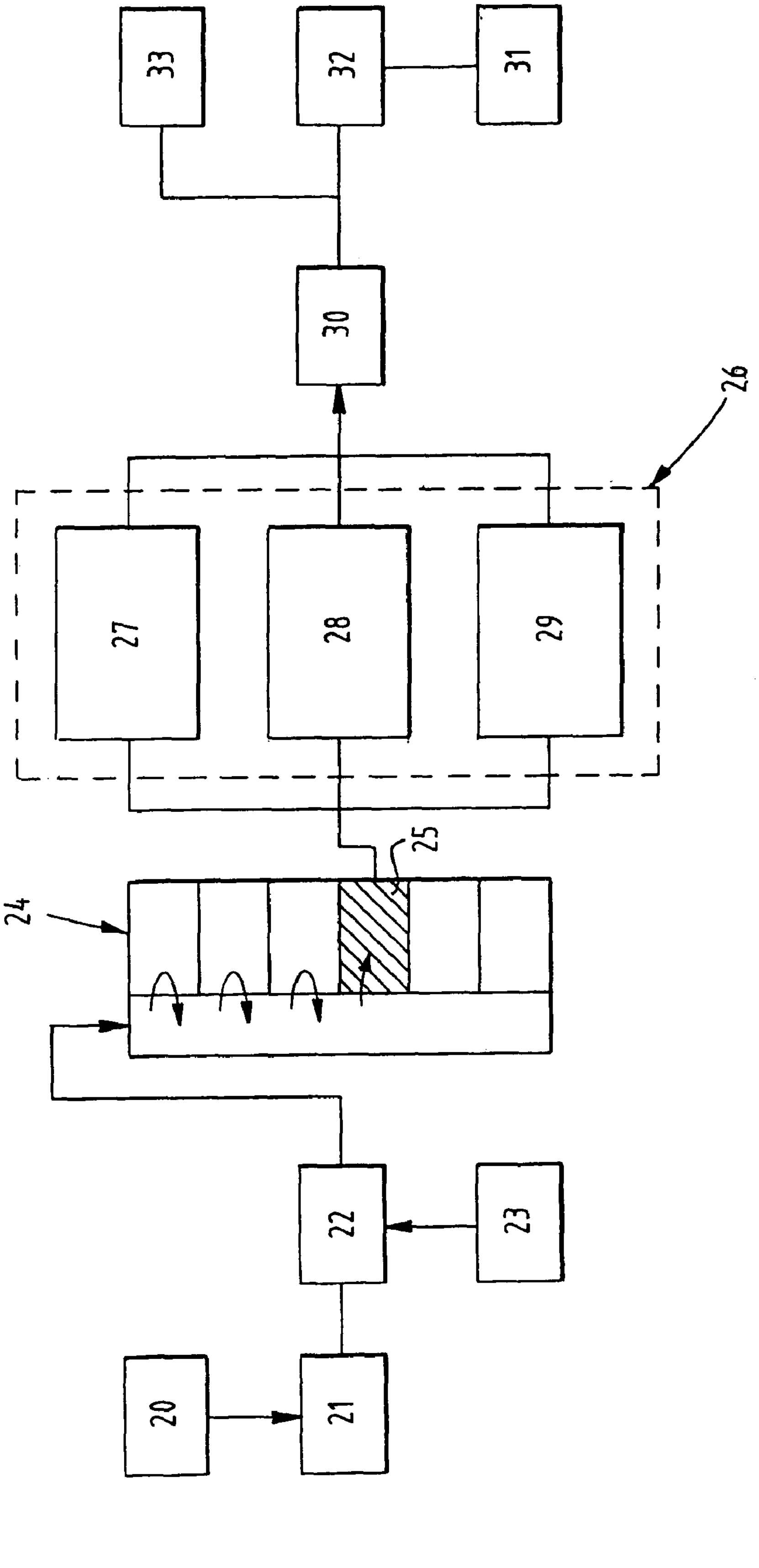
FIG. 3 shows a block diagram with different steps in the case of an alarm condition.

FIG. 3 indicates the most important steps which can take place in the case of an alarm condition. The first step is formed by an observation means, for instance a camera or a microphone 20. This means observes the situation in an object for surveillance. Whatever is observed is compared to a reference observation 21, for instance a standard background sound. Comparison 21 of these two observations can, in the case of a difference, result in an alarm condition 22. Alarm condition 22 activates the alarm action plan which is stored in 23. The steps of the alarm action schedule will be gone through, wherein contact is established with possible contact persons according to the input list. In the case of an alarm condition the completion of the list will only stop when a contact person responds to an alarm report, for instance by sending back an acceptance message, for instance the letters 0 and K. This can take place in known manner. When a contact person is prepared to accept the alarm condition for inspection, he can bring about acceptance 26 in a determined manner. Three options are shown in non-limitative manner, i.e. voice recognition and control 27, a code/OK response 28 or a password verification 29. The contact person then takes steps whereby he can check 30 the alarm condition. Check 30 can result in two possible actions, the alarm condition is a false alarm 33 or the police 32/security service 32 must be alerted. Using a step-by-step plan 31 provided by the invention the checking person can take steps which enable the police to better deal with the alarm condition. This step-by-step plan 31 can be drawn up in consultation with the police and stored in the memory means of the invention.

The invention claimed is:

1. A method for selectively informing at least one person of an alarm condition of an object, comprising determining an alarm condition, providing at least two types of communication connections and at least two alarm report contents suited for different communication connections, establishing at least one communication connection in the case of the alarm condition, sending an alarm report over the communication connection, and selecting the content of the alarm report that is sent depending on the type of communication connection, wherein at least one report can be stored in an alarm action schedule which contains an overview of actions to be taken as a consequence of a determined alarm condition.

2. The method as claimed in claim 1, further comprising producing successive images of the object with at least one camera, comparing successive images and sending the alarm report in the case an image differs to the predetermined extend from a previous image.

3. The method as claimed in claim 1, wherein at least one differing image is sent to the person via a communication connection.

4. The method as claimed in claim 1, wherein the alarm report is sent via a voice connection and the image via an image transmission connection.

5. The method as claimed in claim 4, wherein sound from the area surrounding the object is sent via the voice connection.

6. The method as claimed in claim 1, wherein the alarm report comprises a message that an image has been transmitted via the image transmission connection.

7. The method as claimed in claim 1, wherein the images are produced and processed in digital form.

8. The method as claimed in claim 1, wherein the image transmission connection is chosen from an electronic mail and a telefax connection.

9. The method as claimed in claim 1, wherein at least one of the differing images is stored in combination with the time at which it was produced.

10. The method as claimed in claim 1, wherein at least one person can be designated as contact person in the alarm action schedule.

11. The method as claimed in claim 1, wherein at least one communication connection is designated in the alarm action schedule.

12. The method as claimed in claim 1, wherein at least one time setting can be adjusted for an action in accordance with the alarm action schedule.

13. The method as claimed in claim 1, wherein acceptance by the person alerted in a case of an alarm condition results in discontinuing the completion of the alarm action schedule.

14. The method as claimed in claim 1, wherein the person can operate the invention via a communication connection.

15. The method as claimed in claim 14, wherein the operation takes place by means of a voice connection.

16. The method as claimed in claim 1, wherein the identity of a responding person is verified by means of voice recognition.

17. The method as claimed in claim 1, wherein in the case of a sent alarm report verification takes place as to whether the report has been received and/or read by the person.

18. A device for selectively informing at least one person of an alarm condition of an object, comprising a computer which is provided with input and output members to which at least one electronic camera and a communications network are connected and on which software is installed which can compare successive images produced by the camera with each other and, in the case an image differs to a predetermined extent from a previous image, establishes via the communications network a communication connection with at least one predetermined addressee and sends an alarm report via this communication connection, wherein the computer comprises means for communication with a server adapted with means which can take over preferred settings and which can take over the surveillance function in the case the computer ceases to function.

19. The device as claimed in claim 18, wherein the computer sends at least one differing image to at least one predetermined addressee via an established communication connection.

20. The device as claimed in claim 18, wherein at least one microphone is connected to the input members and wherein the computer transmits the sound picked up by the microphone via an established communication connection.

21. The device as claimed in claim 18, wherein the computer comprises voice recognition computer and the operation of the device is performed under voice control.

22. The device as claimed in claim 18, wherein the computer comprises memory means for composing an alarm action schedule and making it accessible to the communications network.

23. A device for selectively informing at least one person of an alarm condition of an object, comprising a computer which is provided with input and output members to which at least one input means and a communications network are connected and on which software is installed that determines an alarm condition based on information provided by the at least one input means, establishes via the communications network at least one communication connection in the case of the alarm condition, sends an alarm report via the communication connection, and selects the content of the alarm report that is sent depending on the type of communication connection, wherein at least one report can be stored in an alarm action schedule which contains an overview of actions to be taken as a consequence of a determined alarm condition.

* * * * *

UNITED STATES PATENT AND TRADEMARK OFFICE

CERTIFICATE OF CORRECTION

PATENT NO. : 7,054,415 B2
APPLICATION NO. : 10/239263
DATED : May 30, 2006
INVENTOR(S) : Edgar Jozef Beere It is certified that error appears in the above-identified patent and that said Letters Patent is hereby corrected as shown below:

Column 7, Line 34, Claim 2, “extend from a previous image” should read
-- extent from a previous image --

Column 8, Line 40, Claim 21, “voice recognition computer” should read
-- voice recognition software --

Signed and Sealed this

Twenty-first Day of November, 2006

JON W. DUDAS
*Director of the United States Patent and Trademark Office*